United States Patent
Xu

(10) Patent No.: US 11,624,354 B1
(45) Date of Patent: Apr. 11, 2023

(54) ENERGY COLLECTION APPARATUS

(71) Applicant: Xiangyang Xu, Alhambra, CA (US)

(72) Inventor: Xiangyang Xu, Alhambra, CA (US)

( * ) Notice: Subject to any disclaimer, the term of this patent is extended or adjusted under 35 U.S.C. 154(b) by 0 days.

(21) Appl. No.: 17/806,474

(22) Filed: Jun. 10, 2022

(51) Int. Cl.
*F03G 4/00* (2006.01)
*F03G 7/04* (2006.01)
*F03G 7/05* (2006.01)

(52) U.S. Cl.
CPC ............... *F03G 4/063* (2021.08); *F03G 7/04* (2013.01); *F03G 7/05* (2013.01)

(58) Field of Classification Search
CPC ............... F03G 4/063; F03G 7/04; F03G 7/05
USPC ............................................. 60/641.7
See application file for complete search history.

(56) References Cited

U.S. PATENT DOCUMENTS

| | | | | |
|---|---|---|---|---|
| 3,967,449 A * | 7/1976 | Beck | ..................... | F03G 7/05 60/398 |
| 4,057,963 A * | 11/1977 | Basiulis | ................. | F28D 15/025 237/67 |
| 4,083,189 A * | 4/1978 | Fetkovich | ................. | F03G 7/05 60/398 |
| 4,210,819 A * | 7/1980 | Wittig | ....................... | F03G 7/05 290/1 R |
| 4,302,297 A * | 11/1981 | Humiston | ................. | C02F 1/16 202/205 |
| 6,202,417 B1 * | 3/2001 | Beck | ......................... | F03G 7/05 95/248 |

* cited by examiner

*Primary Examiner* — Hoang M Nguyen
(74) *Attorney, Agent, or Firm* — Tsz Lung Yeung

(57) ABSTRACT

An energy collection apparatus includes an upper body and a lower body. The upper body has a first storage compartment, and is arranged to connect to an external energy generator. The lower body downwardly extends from the upper body, and has a second storage compartment. The energy collection apparatus is securely supported in a deep sea level above seabed so that when sea water enters the first storage compartment and the second storage compartment, geothermal energy and pressure difference between the sea water in the first storage compartment and the second storage compartment create upthrust steam at a top portion of the first storage compartment, the upthrust steam being guided to reach the external energy generator for further use.

4 Claims, 2 Drawing Sheets

ENERGY COLLECTION APPARATUS

BACKGROUND OF THE PRESENT INVENTION

Field of Invention

The present invention relates an energy collection apparatus, and more particularly to an energy collection apparatus which is capable of utilizing geothermal energy and pressure differences in sea levels to collect energy for use by electrical generators or other energy generating systems.

Description of Related Arts

There exists general shortage of energy around the world. Conventionally, usable form of energy, such as electrical power, may be produced by fossil fuels, natural gas or heat source originated in nuclear reactor.

Fossil fuels are scarce resources which can only be found in certain parts of the world. When the supply of fossil fuels is altered, the price of energy, such as gasoline price, will become very high. Moreover, burning fossil fuels will cause substantial amount of pollution which has adverse effect to human's health.

There exist several forms of energy which do not involve burning of fossil fuels. For example, wind energy or solar energy have been utilized as "clean energy" in the sense that they do not produce substantial pollution to the environment. However, the sources of these forms of energy (e.g. wing and solar) are usually not stable. Moreover, using these forms of energy involves taking up a large amount of space (usually land space) which contributes to increased cost in producing such forms of energy.

As a result, there is a need to develop an apparatus which is capable of collecting energy from stable source and without taking up a large amount of valuable land space.

SUMMARY OF THE PRESENT INVENTION

Certain variations of the present invention provide an energy collecting apparatus which is capable of utilizing geothermal energy and pressure differences in sea levels to collect energy for use by electrical generators.

Certain variations of the present invention provide an energy collecting apparatus which does not involve burning of fossil fuels and occupy valuable land space for energy production. As a result, the present invention does not generate green house effect.

In one aspect of the present invention, it provides an energy collecting apparatus, comprising:

an upper body having a first storage compartment, the upper body being arranged to connect to an external energy generator; and a lower body downwardly extended from the upper body, the lower body having a second storage compartment, wherein the energy collection apparatus being securely supported in a deep sea level above seabed so that when sea water enters the first storage compartment and the second storage compartment, geothermal energy from the sea and a pressure difference between the sea water in the first storage compartment and the second storage compartment create upthrust steam at a top portion of the first storage compartment, the upthrust steam being guided to reach the external energy generator for further use.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" can refer to one element directly or indirectly set or arrange on another element. Therefore, the above terms should not be an actual connection limitation of the elements of the present invention.

It should also be appreciated that the terms "center", "length", "width", "thickness", "top", "bottom", " front", "rear", "left", "right", "vertical", "horizontal", "upper", "lower", "interior", and "exterior" in the following description refer to the orientation or positioning relationship in the accompanying drawings for easy understanding of the present invention without limiting the actual location or orientation of the present invention.

Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Therefore, the above terms should not be an actual connection limitation of the elements of the present invention.

Figure 1:
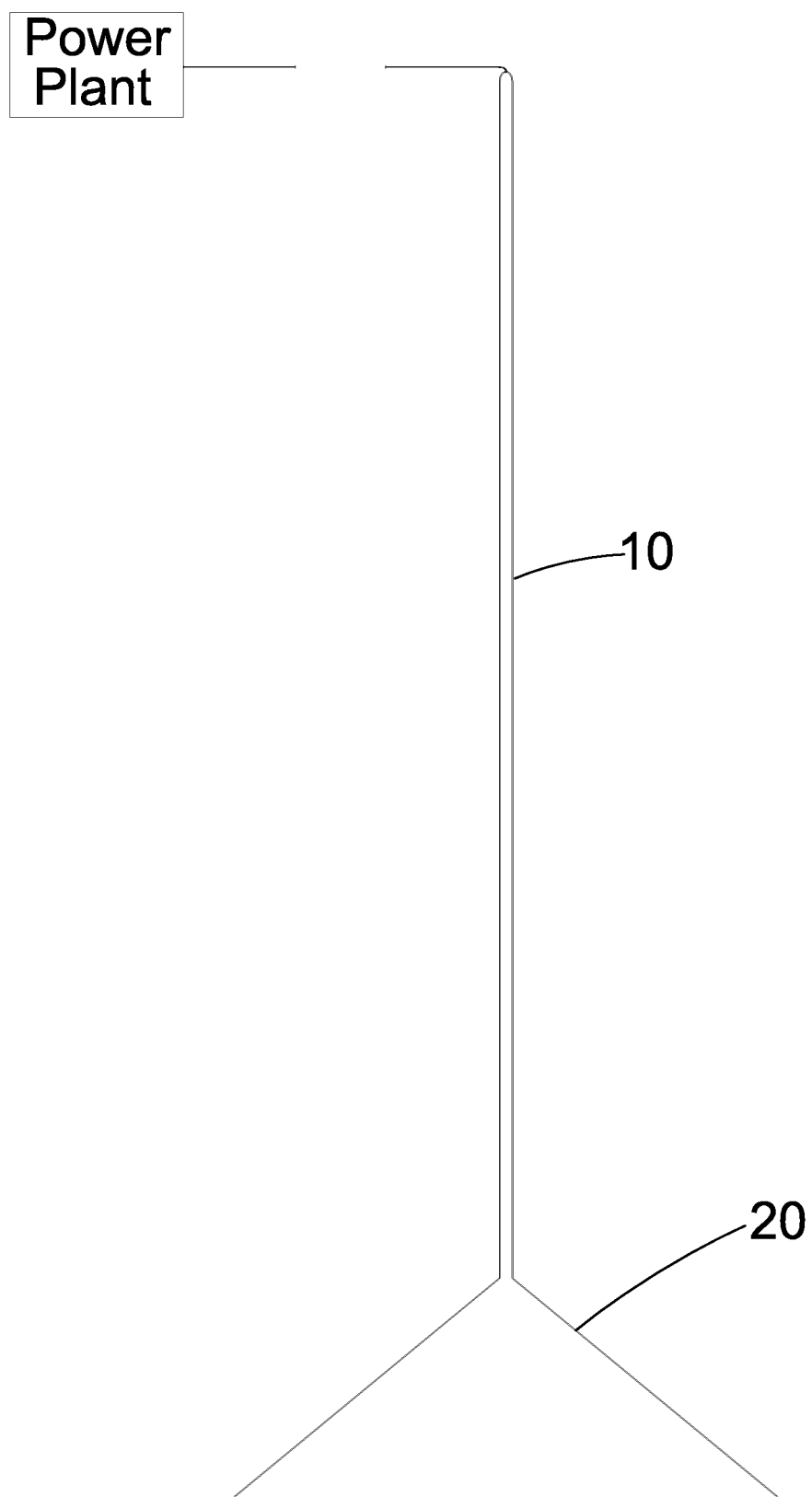
FIG. 1 is a schematic diagram of an energy collection apparatus according to a preferred embodiment of the present invention.
Figure 2:
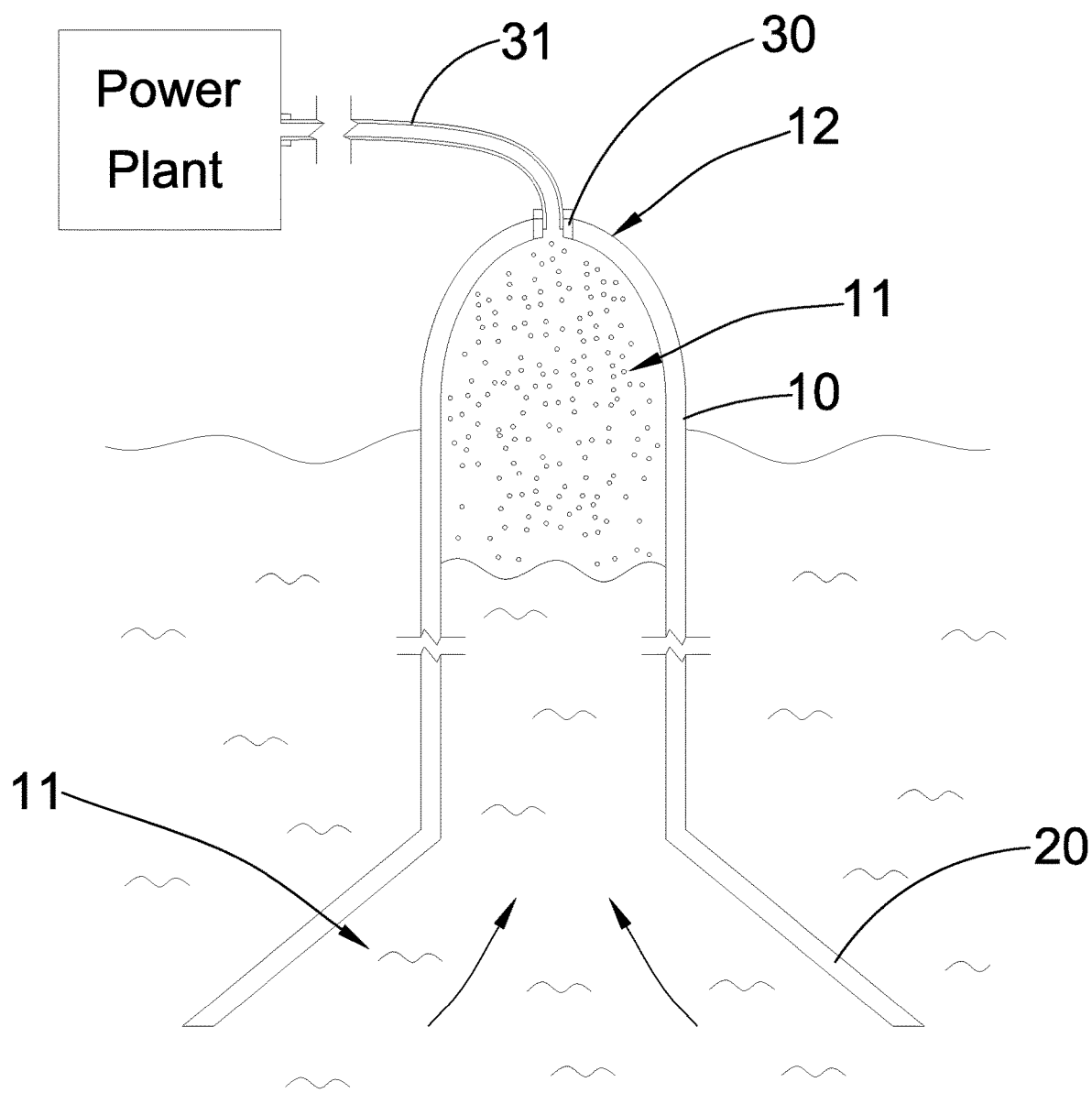
FIG. 2 is a partially enlarged diagram of the energy collection apparatus according to the preferred embodiment of the present invention.

Referring to FIG. 1 to FIG. 2 of the drawings, an energy collection apparatus according to a preferred embodiment of the present invention is illustrated. The energy collection apparatus may comprise an upper body 10 and a lower body 20 extended from the upper body 10. The energy collection apparatus may be immersed in the sea at a predetermined sea level so as to let water of different pressure enter the upper body 20 and the lower body 20.

The upper body 10 may have a first storage compartment 11, and may be arranged to connect to an external energy generator, such as a power plant.

The lower body 20 may downwardly extend from the upper body 10, and may have a second storage compartment 21. The energy collection apparatus may be securely supported in a deep sea level above seabed so that when sea water enters the first storage compartment 11 and the second storage compartment 21, geothermal energy from the sea and a pressure difference between the sea water in the first storage compartment 11 and the second storage compartment 21 may create upthrust steam at a top portion 12 of the first storage compartment 11, wherein the upthrust steam may be guided to reach the external energy generator for further use.

According to the preferred embodiment of the present invention, the upper body 10 and the lower body 20 may form an integral body or connected as an integral body and may be constructed by strong and rigid material, such as metal or suitable composite material. The material must be strong enough to withstand upthrust steam and pressure generated in the first storage compartment 11.

Preferably, each of the upper body 10 and the lower body 20 may have a circular cross sectional shape wherein a diameter of the lower body 20 is gradually increasing from the upper body 10 to a lower end of the energy collection apparatus. In other words, the lower body 20 may form a tapered structure with respect to the upper body 10.

Referring to FIG. 1 of the drawings, the upper body 10 may have a curved outer contour so as to evenly spread and withstand water pressure, and the pressure generated in the first storage compartment 11. Many exemplary configurations of the upper body 10 may allow it to have such outer contour. For example, the upper body 10 may have a spherical structure or an elliptical structure. Other outer contours of the upper body 10 may also be possible. For example, the upper body 10 may have a tubular structure with a rounded top portion 12 to form a bullet-like outer contour.

The upper body 10 may be connected to the external energy generator through at least one specific pipe or conduit so as to allow pressurized steam to be transferred to the external energy generator. An example of the external energy generator may be a power plant. The energy collected in the upper body 10 may be transferred to the power plant for providing energy to generate electricity. In this case, the external energy generator does not need to rely on burning of fossil fuels as the source of producing energy.

On the other hand, the lower body 20 may have an enlarged structure with respect to the upper body 10. In the preferred embodiment of the present invention, the lower body 20 may have a conical external contour and may have a gradually increasing diameter from the upper body 10 toward the bottom end of the energy collection apparatus. While other cross sectional shapes or external contours of the lower body 20 are possible, the goal is to allow the maximum or the optimal amount of sea water to enter the second storage compartment 21. The lower body 20 may also be configured from strong material so as to withstand water pressure in deep sea.

The energy collection apparatus may further comprise a regulator valve 30 provided on the top portion 12 of the upper body 10, wherein the regulator valve 30 may be connected to the external energy generator such as a power plant via a transmission conduit 31.

The energy collection apparatus is to be immersed in sea water at a very deep level. The energy collection apparatus may be supported in an upright (i.e. substantially vertical) orientation. The energy collection apparatus may be supported by the seabed through construction frames and structures, or may be connected to an existing oil platform. In the preferred embodiment of the present invention, the energy collection apparatus may be immersed in the sea with just the top portion 12 exposed out of sea level for convenient maintenance and installation of the regulator valve 30 and the transmission conduit 31. The upthrust steam created in the first storage compartment 11 may be transmitted to the external energy generator via the regulator valve 30 and the transmission conduit 31.

It is worth mentioning that in order to prevent unnecessary energy loss on the energy collection apparatus, each of the upper body 10 and the lower body 20 may be constructed to be thermally insulated. In the preferred embodiment of the present invention, each of the upper body 10 and the lower body 20 may be configured to have a double wall structure so that heat from inside the energy collection apparatus is prevented from losing through the external wall of the upper body 10 and the lower body 20. Suitable insulting materials may also be added in between the double-walled structure for further enhancing thermal insulation effect of the upper body 10 and the lower body 20.

Moreover, according to the preferred embodiment of the present invention, a preferred overall height of the energy collection apparatus may be approximately 800 m while a diameter of the upper body 10 may be approximately 1 m to 10 m, making the entire energy collection apparatus to form an elongated structure.

The present invention utilizes geothermal energy as an energy source and collect geothermal energy due to pressure difference of sea water within the energy collection apparatus. One skilled in the art would appreciate that with the use of the present invention, traditional energy sources which may produce pollution will be replaced by the present invention which does not involve the use of burning fossil fuels and does not produce greenhouse gas or any pollution at all. Moreover, geothermal energy has massive quantity so that human being will no longer rely on traditional energy sources.

In order to illustrate the performance of the present invention, a simple experiment was conducted, in which a container resembling the energy collection apparatus was built. The container was subject to heating from the bottom. The temperatures of two different points in the container were recorded. The temperatures of two different levels with respect to time was recorded and presented and Table 1 below. The vertical distance between the two different temperature levels was set to be 2 inches.

TABLE 1

| Time (seconds) | Temperature at deep water level (F.) | Temperature at shallow water level (F.) |
|---|---|---|
| 22:14 | 75.9 | 75.6 |
| 22:16 | 75.4 | 76.4 |
| 22:18 | 75 | 78.7 |
| 22:20 | 80.3 | 81.1 |
| 22:22 | 82.4 | 83.2 |
| 22:24 | 85.3 | 86.2 |
| 22:26 | 88.0 | 88.6 |
| 22:28 | 89.0 | 90.4 |
| 22:30 | 92.9 | 93.9 |
| 22:32 | 95.2 | 95.8 |
| 22:34 | 97.9 | 99.0 |
| 22:36 | 101.1 | 101.5 |
| 22:38 | 103.4 | 104.2 |
| 22:40 | 106.4 | 106.9 |
| 22:42 | 110.5 | 111.0 |
| 22:44 | 111.2 | 112.1 |
| 22:46 | 114.7 | 114.6 |

TABLE 1-continued

| Time (seconds) | Temperature at deep water level (F.) | Temperature at shallow water level (F.) |
|---|---|---|
| 22:48 | 116.8 | 117.5 |
| 22:50 | 119.5 | 120.3 |
| 22:52 | 121.8 | 125.4 |
| 22:54 | 124.7 | 127.5 |
| 22:56 | 126.3 | 129.8 |
| 22:58 | 129.4 | 131.7 |
| 23:00 | 131.1 | 131.0 |
| 23:02 | 135.9 | 136.7 |
| 23:04 | 137.3 | 137.9 |
| 23:06 | 138.3 | 139.1 |
| 23:08 | 140.3 | 141.5 |
| 23:10 | 143.0 | 143.6 |

The present invention, while illustrated and described in terms of a preferred embodiment and several alternatives, is not limited to the particular description contained in this specification. Additional alternative or equivalent components could also be used to practice the present invention.

What is claimed is:

1. An energy collection apparatus, comprising:

an upper body having a first storage compartment, said upper body being arranged to connect to an external energy generator; and a lower body downwardly extended from said upper body, said lower body having a second storage compartment, wherein said energy collection apparatus being securely supported in a deep sea level above seabed so that when sea water enters said first storage compartment and said second storage compartment, geothermal energy from the sea and a pressure difference between said sea water in said first storage compartment and said second storage compartment create upthrust steam at a top portion of said first storage compartment, said upthrust steam being guided to reach said external energy generator for further use, wherein at least one of said upper body and said lower body is constructed to have a double wall structure so as to be thermally insulated, each of said upper body and said lower body having a circular cross sectional shape wherein a diameter of said lower body is gradually increasing from said upper body to form a tapered structure of said lower body with respect to said upper body, an overall vertical height of said energy collection apparatus is at least approximately 800 meters.

2. The energy collection apparatus, as recited in claim 1, further comprising a valve regulator mounted on a top portion of said upper body, wherein said upthrust steam is arranged to be transmitted to said external energy generator through said valve regulator.

3. The energy collection apparatus, as recited in claim 1, wherein said upper body has a curved outer contour so as to evenly spread and withstand water pressure.

4. The energy collection apparatus, as recited in claim 1, wherein said lower body has a conical external contour and has a gradually increasing diameter from said upper body toward a bottom end of said energy collection apparatus.

* * * * *